United States Patent

[11] 3,618,693

[72] Inventor Phillip Graham
2825 Glenmore Ave., Pittsburgh, Pa. 15216
[21] Appl. No. 3,830
[22] Filed Jan. 19, 1970
[45] Patented Nov. 9, 1971
Continuation-in-part of application Ser. No. 675,592, Oct. 16, 1967, now Patent No. 3,495,676, which is a continuation-in-part of application Ser. No. 457,627, May 21, 1965, now Patent No. 3,356,175, which is a continuation-in-part of application Ser. No. 226,623, Sept. 27, 1962, now Patent No. 3,219,384, which is a continuation-in-part of application Ser. No. 857,187, Dec. 3, 1959, now Patent No. 3,056,627, and a continuation-in-part of 721,150, Mar. 13, 1958, now Patent No. 3,056,462; said 857,187, , Continuation-in-part of application Ser. No. 557,938, Jan. 9, 1956, now Patent No. 2,916,324; said 721,150, , Continuation-in-part of application Ser. No. 557,938, Jan. 9, 1956, now Patent No. 2,916,324; said 721,150, , Continuation-in-part of application Ser. No. 449,695, Aug. 13, 1954, now abandoned.

[54] SAFE VEHICLE BODY
22 Claims, 16 Drawing Figs.
[52] U.S. Cl. ................................................. 180/93, 280/150 B, 293/2, 293/80
[51] Int. Cl. ................................................. B60r 21/02
[50] Field of Search ................................. 180/91, 92, 93, 94, 95; 280/150 B, 150 A; 293/2, 80, 53

[56] References Cited
UNITED STATES PATENTS

| | | | |
|---|---|---|---|
| 2,959,251 | 11/1960 | Landman et al. | 180/91 |
| 2,843,224 | 7/1958 | Landman et al. | 180/93 |
| 1,419,366 | 6/1922 | Fial | 180/93 |
| 3,349,865 | 10/1967 | Deutsch | 180/93 |
| 3,424,263 | 1/1969 | Black | 180/82 |

Primary Examiner—Benjamin Hersh
Assistant Examiner—John P. Silverstrim
Attorney—William J. Ruano ABSTRACT: The invention relates to a safe body for a lightweight automobile that acts to allow survival of its occupants during a violent collision between the light automobile and a heavier vehicle by diverting some of the momentum force of the heavier vehicle into the roadway so it bypasses most of the lightweight automobile. The safe body also acts to severely damage the heavier vehicle. A collision impact against a bumper, causes a stop brace to pivot downwardly to the roadway so as to brace the safe vehicle against the force of the heavier vehicle, causing some force to be diverted diagonally through the stop brace into the roadway. Then the heavier vehicle pushes the light vehicle and causes the stop brace to pivot about its point of contact with the roadway, causing the impacted end of the safe vehicle to be propelled upwardly into a position higher than the position of the impacted end of the heavier vehicle, thus allowing the heavier vehicle to move forwardly by wedging under and carrying the light automobile, rather than to crush it or to push the light vehicle aside. This invention has improvements over the safe vehicle body described in my copending application Ser. No. 675,592, since the improved stop brace coacts with other portions of the safe body to safely cushion and divert collision impact forces in progressive steps.

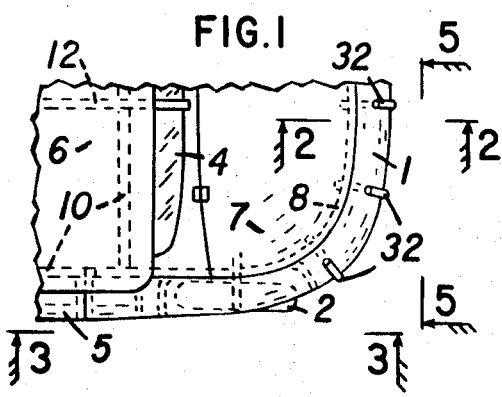
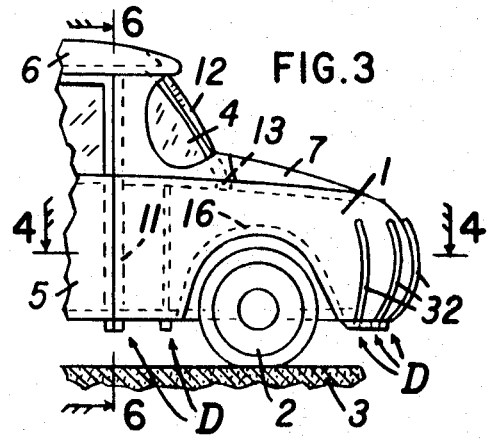
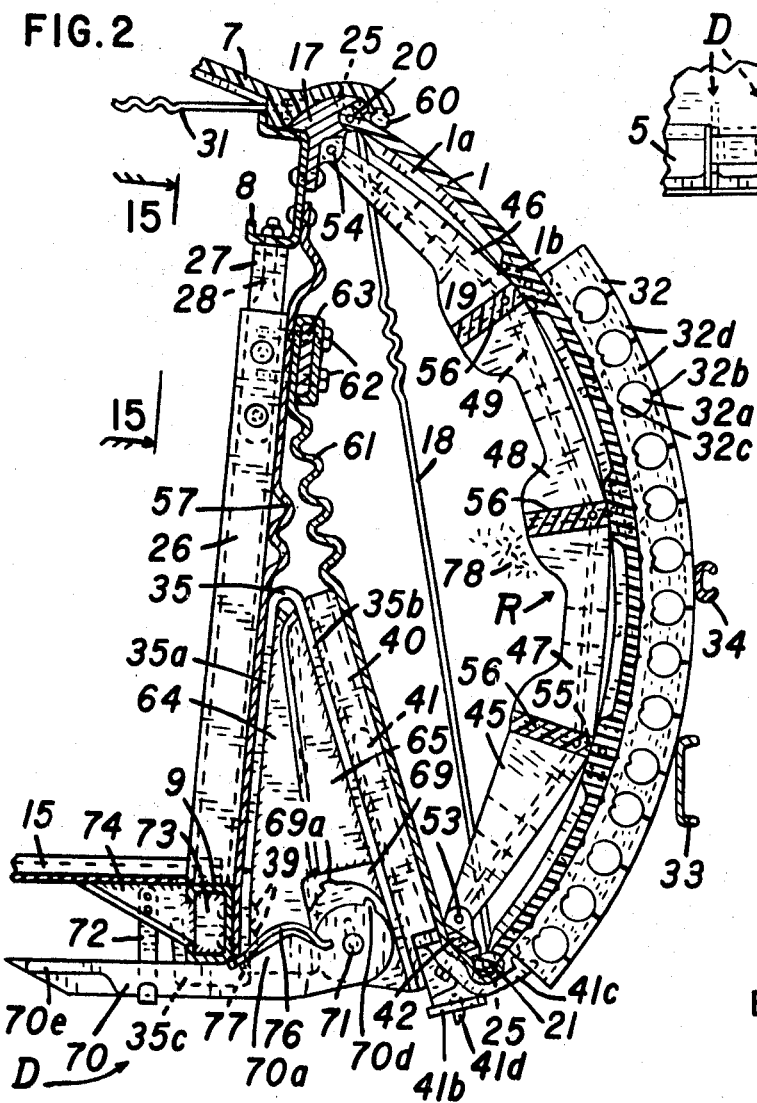
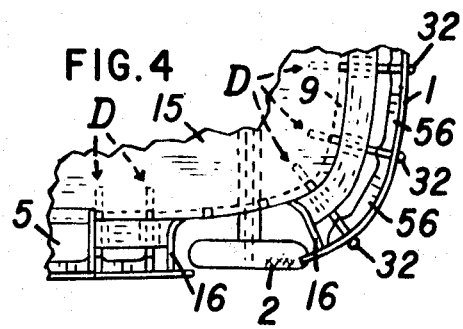
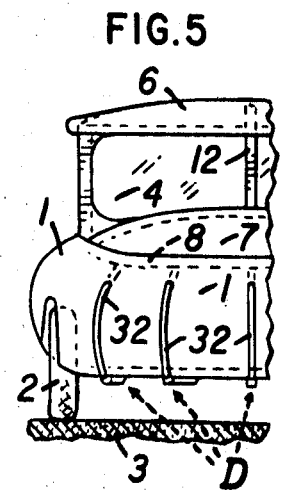
INVENTOR.
PHILLIP GRAHAM
BY William J. Ruano
ATTORNEY

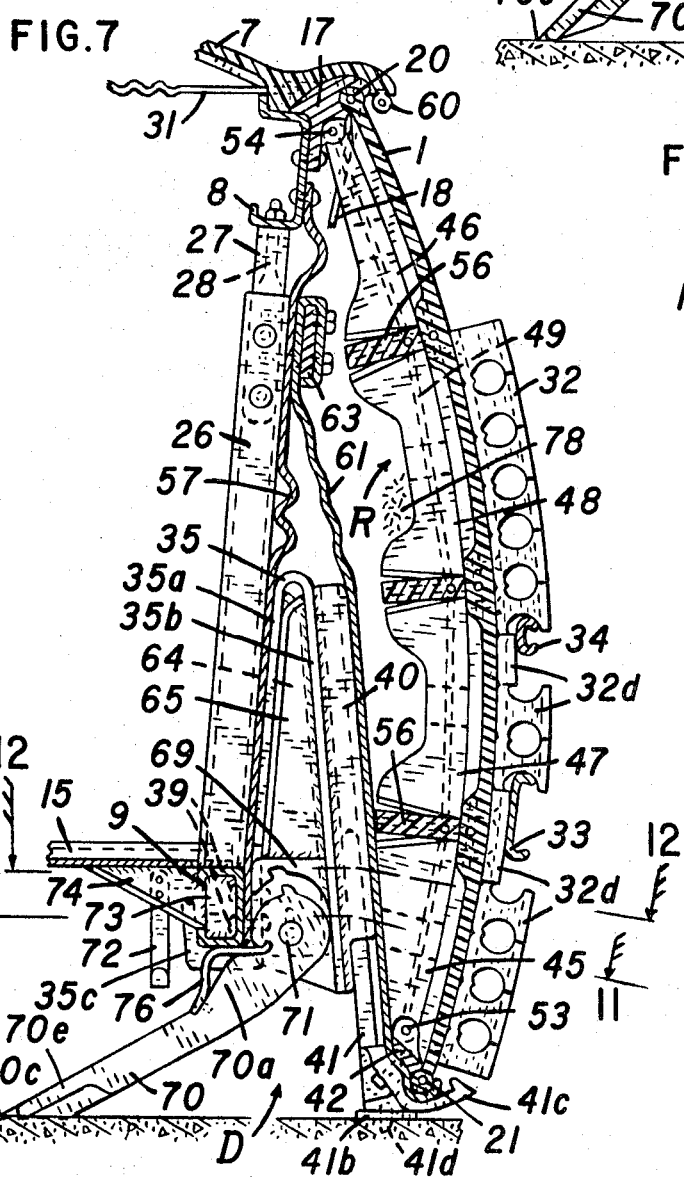

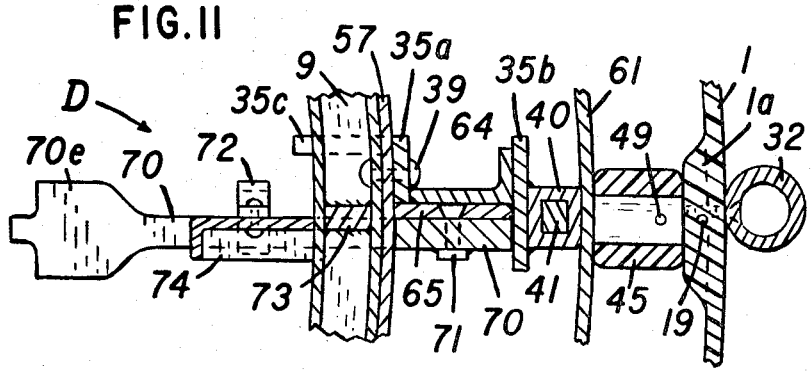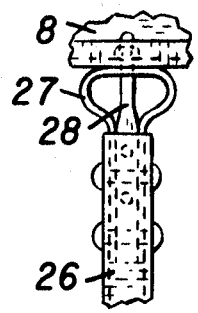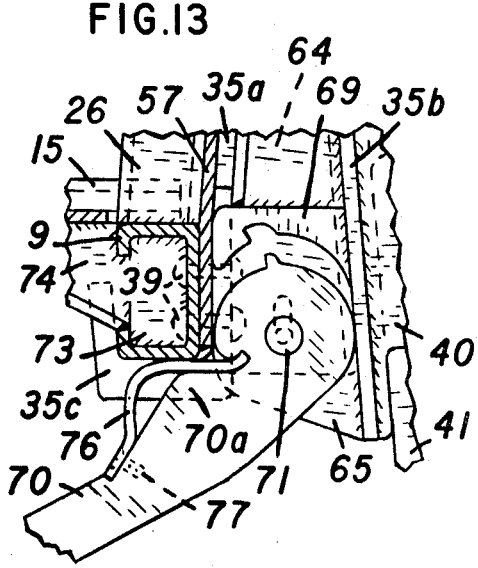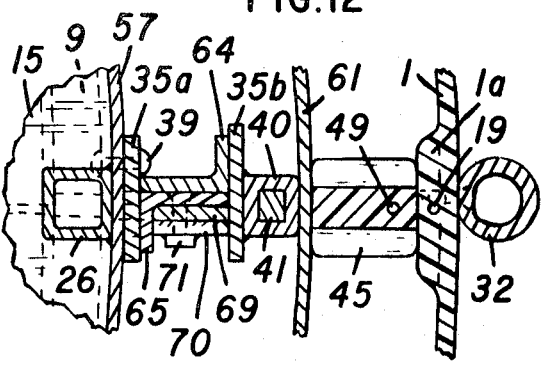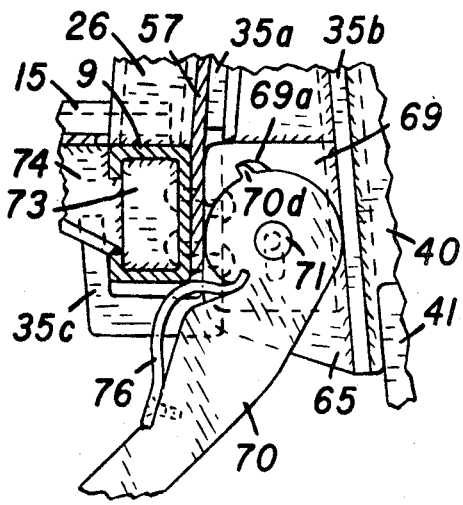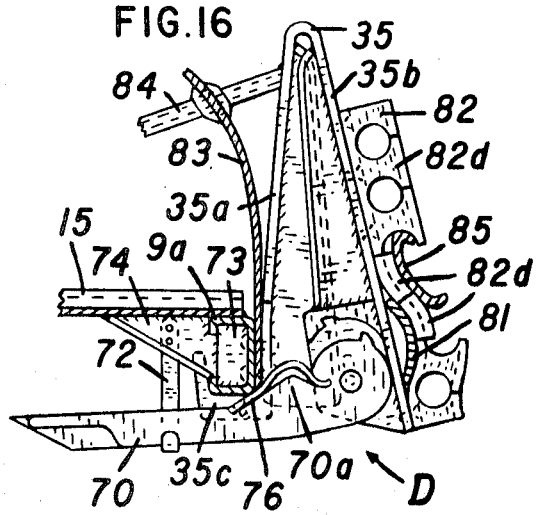

SAFE VEHICLE BODY

This invention is a continuation-in-part of my copending application Ser. No. 675,592 filed Oct. 16, 1967, entitled Safe Vehicle Body now U.S. Pat. No. 3,495,676. Applicant also claims rights to an earlier filing date to common subject matter that is described in the present application, which was also described in his applications: Ser. No. 457,627, filed May 21, 1965, entitled Safe Vehicle Body, now U.S. Pat. No. 3,356,175; Ser. No. 226,623 filed Sept. 27, 1962, entitled Safe Vehicle Body, now U.S. Pat. No. 3,219,384; Ser. No. 857,187 filed Dec. 3, 1959, entitled Safe Vehicle Body, now U.S. Pat. No. 3,056,627; Ser. No. 721,150 filed Mar. 13, 1958 entitled Curved Vehicle Bumper, now U.S. Pat. No. 3,056,462; Ser. No. 557,938 filed Jan. 9, 1956 entitled Safe Conveyance Body, now U.S. Pat. No. 2,916,324, and Ser. No. 449,695 filed Aug. 13, 1954, entitled Curved Barrier, now U.S. Pat. No. 2,826,788. The copending application Ser. No. 675,592 is a continuation-in-part of application Ser. No. 457,627; application Ser. No. 457,627 is a continuation-in-part of application Ser. No. 226,623; application Ser. No. 226,623 is a continuation-in-part of applications Ser. No. 857,187 and Ser. No. 721,150; applications Ser. No. 857,187 and Ser. No. 721,150 are continuation-in-part applications of application Ser. No. 557,938 and application Ser. No. 721,150 was a continuation-in-part of application Ser. No. 449,695, until the continuation-in-part claim was deleted in 1962 when the specification was largely deleted to restrict it to bumpers.

This invention relates to a safe vehicle body having a pivotal stop brace means that can pivot downwardly from a retracted position into a diagonal position and grip the roadway in response to a collision impact against a bumper portion by a heavier vehicle or a vehicle having greater momentum force, and brace the impacted end of the safe body against the collision force of the heavier vehicle to divert much of the heavier vehicle's momentum force diagonally into the roadway. This diverting action causes some force to bypass most of the safe body, thereby restraining the body from being deformed to a critical degree. The more forceful heavier automobile pushes the safe light vehicle and causes the stop brace to pivot about its point of contact with the roadway, causing the impacted end of the safe vehicle to be propelled upwardly into a position higher than the position of the impacted end of the heavier vehicle, thus allowing the heavier vehicle to move forwardly by wedging under and carrying the light automobile, rather than to crush it, or to allow a heavier vehicle such as a bus or large truck to push the light vehicle aside. Conventional automobiles are reinforced to enable stunt drivers to safely roll them over and the like. Therefore, a small lightweight automobile can be built strong enough to resist being critically damaged when it is propelled or rolled over when a heavier automobile is forced under it, whereas a conventional small automobile cannot safely absorb a direct collision from a large conventional automobile that is about three times its weight.

After an impact releases the pivotal stop brace from a retracted position, the brace constantly and securely bears against the roadway, even while the safe body deflects or bounces upwardly to an extent, as the pivotal stop brace pivots to maintain contact with the roadway.

The pivotal stop brace is relatively short and slight, yet strong enough to transmit a great impact force into the roadway, thus it would not be objectionable in length, weight or bulk.

The safe vehicle body is a cushionable automobile body that has a yieldable bowed shell or bumper portion that can yield by flattening to an extent when it is struck by a heavier vehicle. The flattening of the bumper portion causes the stop brace to pivot downwardly from a retracted position. The flattening also causes much impact force to be diverted in a vertical direction through the bowed shell so as to harmlessly absorb it by the bowed shell striking the roadway and by the bowed shell jacking and lifting the body. The bowed shell portion includes spike means to snag into a roadway and locally collapsible tubes, which collapse when impacted and form grappling hook means which can snag into an object that it is in a collision with. The stop brace includes cam means to force it to pivot down with positive nonlagging movement, and the cam means can shear the fasteners that hold the stop brace in place, so the stop brace can be jettisoned. The stop brace also includes a shear key to restrain it momentarily from pivoting, after the brace strikes the roadway. A spring pressures the stop brace after it has pivoted, to compensate for various degree of deflection of the safe body due to various loadings of the vehicle.

Bowed bumper portions with pivotal stop brace means may be used effectively on the rear and on the front of a small lightweight automobile body. The rear bumper portion would be particularly useful in resisting rear end collisions that occur frequently on divided highways. The safe vehicle body includes means that would allow the use of economical lightweight automobiles, including electrically propelled automobiles, with a much higher degree of safety. At present, there are numerous types of small automobiles, each of which automobiles weigh only about one-third as much as a conventional large automobile. Violent collisions between the heavy automobiles and lighter automobiles usually results in the lighter automobiles being badly damaged and their occupants being seriously injured. Operators of heavy automobiles frequently violate the law and infringe on the rights of the occupants of lightweight automobiles, by illegally taking a right-of-way, and by tailgating. A lightweight automobile having the present safe body would furnish more protection to its occupants and it would be a deterrent to reckless operators of heavy automobiles, since the lightweight automobiles would sustain less damage than usual, while the heavier automobile could sustain much more damage than usual and there would be greater possibility of injury to occupants of the heavier automobile. While this type of safe vehicle body would be most useful for vehicles, such as automobiles, it may also be used for other vehicles.

The safe vehicle body described in the present application is an improvement over the safe vehicle body described in my copending application Ser. No. 675,592. The improvements include a sloping camlike edge on the pivotal stop brace that is forced against the chassis to cause the brace to pivot downwardly to a diagonal position, with positive nonlagging movement and engage a roadway, in response to collision impact on an improved bumper portion. The cam movement of the stop brace is positive, thus it eliminates the possibility that the stop brace would pivot too slowly or fail to pivot, as would a stop brace that is to be forced down by the old spring that is shown in my copending application, if the spring became badly corroded. The old spring means would not act with the positive timed action of the cam on the stop brace, since it could lag and reach the roadway too late. The old spring means is objectionably heavy since it would have to be heavy to be strong enough to rapidly force a stop brace downwardly and it would objectionably and hazardously tend to pressure the stop brace downwardly when the stop brace is being kept in a retracted position. The camlike edge is shaped so the cam action that forces the stop brace to pivot downwardly, terminates after the tip of the stop brace has substantially reached the roadway, thus the tip is not forced to gouge the roadway in a direction towards an opposing vehicle.

The bumper portion is improved by having locally collapsible tube portions that collapse and form improved grappling hooks when impacted by portions of the opposing vehicle. The collapsible tube portions are useful since they absorb force in collapsing and they make positive clutching contact with portions of the opposing vehicle, also they are smooth and free of sharp projections before they are collapsed by being impacted, thus they are not objectionable or illegal since they cannot cause snagging until they are impacted by a great force. They cannot be collapsed by striking a pedestrian. The collapsible tubes eliminate the exposed grappling hooks of the earlier disclosure. The stop brace is further improved by having the camlike edge shaped so it bears intensely against the chassis momentarily after it starts to pivot about its point of contact with the roadway, causing shearing of the fasteners that hold a stop brace support to the chassis, so the impacted end of the safe vehicle can be propelled or be flipped upwardly without the drag effect of raising the stop brace and its support. A still further improvement includes a shear key on the upper portion of the stop brace that acts after the stop brace has pivoted slightly about its point of contact with the roadway to firmly seat the brace in the roadway. The key engages a keyway in a socket on the stop brace support. The shear key momentarily restrains the stop brace from pivoting, thus causing more impact force to be diverted through the stop brace into the roadway, until some of the remaining impact force causes the key to shear, thereby absorbing force in the shearing action. There is an improved lightweight spring that pressures the stop brace downwardly after it has been forced downwardly by the cam action so as to restrain the stop brace from bouncing and to compensate for various degrees of positioning of the impacted end of the body above the roadway, due to various loadings of the vehicle. Thus the spring is nonhazardous since it does not tend to force the stop brace down before a collision. The improvements include a strong socket for the stop brace so the brace can transmit a great impact force.

The safe body with front bumper pivotal stop means would be particularly useful for a small automobile that has its occupant's compartment close to the front of the vehicle since the front portion of such an automobile has a short depth of allowable deformation to cushion a collision impact. Such a light vehicle requires a higher degree of restraining means to restrain and cushion occupants than can be had with common seat belts or shoulder straps. Suitable restraining means are described in my U.S. Pat. Nos. 3,545,879; 3,262,716; 3,129,017; 2,977,135; 2,827,305; and 2,826,788. These disclosures describe vehicle occupant safety barriers that provide a high degree of cushioning and restraining of an occupant to prevent him from being hurled by momentum against the rigid portions of the interior of the vehicle during a rapid deceleration of a vehicle that is involved in a collision.

An object of my invention is to provide a safe vehicle body having a bumperlike portion that will yield by flattening to an extent under a collision impact, to cushion and divert collision impacts against it. The bumperlike portion includes locally collapsible tube portions. The vehicle body includes a pivotal diagonal stop brace means that is positively forced with cam means, to pivot down to the roadway in response to the impact action, to cause the brace to grip the roadway to provide a means to diagonally divert momentum of the opposing more forceful or heavier vehicle into the roadway and to thus stop or restrain the heavy opposing vehicle to an extent. The stop brace includes shear key means to momentarily restrain the brace from pivoting about its point of contact with the roadway. The stop brace includes means to allow it to pivot about its point of contact with the roadway, to raise the impacted end of the safe vehicle body, to allow a heavier automobile to wedge its way under the impacted end of the safe body, or to allow a heavier vehicle, such as a bus or truck, to push the light vehicle aside. The stop brace includes means to shear the fasteners that fasten the brace support to the chassis, so that the vehicle can be propelled upwardly without the drag effect of carrying the stop brace and engaging bumper portions with it.

Other objects of my invention will become more apparent from the following description taken with the accompanying drawings wherein:

FIG. 1 is a fragmentary plan view showing a portion of an automobile having a safe body;

FIG. 2 is an enlarged fragmentary sectional elevational view taken along line 2—2 of FIG. 1;

FIG. 3 is a fragmentary elevational view taken along line 3—3 of FIG. 1;

FIG. 4 is a fragmentary sectional view taken along line 4—4 of FIG. 3;

FIG. 5 is a fragmentary elevational view taken along line 5—5 of FIG. 1;

FIG. 6 is a fragmentary sectional view taken along line 6—6 of FIG. 3;

FIG. 7 is a fragmentary view that is similar to FIG. 2, the view differing by showing a bumper portion being flattened during a collision with a heavier vehicle, causing a stop brace to be forced down so it engages the roadway;

FIG. 8 is a fragmentary sectional elevational view that is similar to FIG. 2, but it shows the positions of the stop brace and bumper after the safe body has been pushed slightly by the heavier vehicle;

FIG. 9 is a fragmentary sectional elevational view that is similar to FIG. 2, but it shows the stop brace raising the impacted end of the safe body;

FIG. 10 is a fragmentary elevational view showing details of a stop brace portion modification having a friction shoe that engages the roadway;

FIG. 11 is a fragmentary sectional view taken along line 11—11 of FIG. 7;

FIG. 12 is a fragmentary sectional view taken along line 12—12 of FIG. 7;

FIG. 13 is an enlarged fragmentary sectional view that is taken from a portion of FIG. 7;

FIG. 14 is an enlarged fragmentary sectional view that is taken from a portion of FIG. 8;

FIG. 15 is a fragmentary elevational view taken along line 15—15 of FIG. 2;

FIG. 16 is a fragmentary sectional elevational view that shows a modification of the structure shown in FIG. 2.

The safe vehicle body is illustrated as an automobile body. My U.S. Pat. No. 2,916,324 describes most of the safe body in detail.

A quarter portion of an automobile is shown since a highly functional safe automobile body may be substantially symmetrical about its longitudinal axis and its transverse axis. The automobile illustrated in the drawings has a slightly resilient yieldable body shell. Broadly stated, the automobile body in accordance with the present invention consists of bowed shell portions with yieldable ties across the chords of the bows. The shell may be made of such materials as metal, plastic and fiber glass. Collision impacts cause the bowed shells to yield by flattening partially, and the yieldable ties to yield by stretching until the forces are absorbed or diverted.

The shell of the body is confined to maintain highly efficient arched or bowed shapes. The bowed shapes act as arched compression members that can yield and flatten partially in cushioning collision impacts. While the shell is flattening partially, the collision impact force is diverted and spread over a greater portion of the body so the force can be resisted by the large portion of the body that is brought into play, to thus gradually absorb the force. There are ribs that can yieldably flatten since they help to maintain arched shapes of the shell portions as they partially flatten. The body members are shaped and combined so as to provide continuity to the automobile body so the body as a unit can act to cushion and resist collision impacts. The ends and the sides of the automobile body have the highly yieldable and resilient features to cause cushioning actions from collision impacts, also to a more limited degree, these features are incorporated into horizontal cover portions, which may be the roof, the hood, and the trunk lid. The front and rear of the automobile body may be of substantially identical structural features, since head-on collisions and rear end collisions of intense magnitude are frequent occurrences. The horizontal cover portions that include the hood, trunk lid and roof, yield to cushion when the automobile rolls over. The overhanging edge of the roof is resilient, which allows it to yield when it is impacted.

The yielding of the body, in general, is controlled to an extent so as to prevent severe deformation of the occupant's compartment. Thus the safe body is expendable to protectively cushion its occupants.

A bowed shell or skin 1 has a large middle ordinate which provides a long distance in which the shell can flatten to yield and cushion an impact force. The vehicle has conventional wheels 2. The wheels 2 bears on a roadway 3. An end window 4 is suitable mounted. A door 5 has a yieldable shell. The body includes a roof shell 6. A horizontal shell 7 may be a trunk lid or a hood. Metal channels 8 and 9 are arched in length across the end of the vehicle. Rigid members 10 support the roof shell 6. Members 10 are supported by post means 11. The roof may have a yieldable center rib 12. The rib 12 engages a transverse member 13. A crimped yieldable sheet 14 may be used to form a ceiling. A floor 15, or a motor (not shown), stiffens the chassis channel 9, restraining the channel from bending as the result of the impact against the shell 1. Flexible mud guard means 16 may be made of highly elastic plastic.

Typical details of an end bumper portion and adjacent portions of the safe body are shown clearly in FIGS. 2, 7, and 11-15. A retainer bar 17 is riveted or welded to the channel 8. A wire spring tie 18 forms a resilient tie across the chord line of the shell 1. The tie 18 may be made so that it can deflect to an extent, then restrain without yielding until it is forced to yield further by breaking action. The shell 1 may have a wire grid 19 embedded in it, with the wires positioned horizontally and vertically. The tie 18 is fastened close to the reinforcing wire 20 and 21 in the bulblike edgings of the shell 1. The wire 21 is spirally coiled to allow it to yield locally. U-shaped wire fasteners 25 are looped about the wires 20 and 21, and welded to adjacent members, to fasten the top and bottom edges of the shell 1.

Spokelike radial ties (not shown), that are similar to radial ties shown in my copending application Ser. No. 675,592, may be used to restrain the shell 1 from bulging outwardly.

The shell 1 may be reinforced with typical vertical yieldable ribs R. Ribs R are yieldable bumper shaft means. At each rib R, a tie post 26 is welded to the chassis channel 9. The top of the tie post 26 is attached to a horseshoe-shaped resilient steel bar 27 and a limit bolt 28. The bolt 28 engages the channel 8. This type of tie and support allows the shell 7 to yield and cushion the shock of an impact on its top surface during rollovers. The bar 27 and the bolt 28 prevent the channel 8 and adjoining parts from rising without the tie post 26 when an impact on the shell 1 tends to divert force vertically through the shell and raise the impacted end of the body. A yieldable tie means 31 may be used to tie across the bow of the panel 7 to allow the panel 7 to flatten to an extent during rollovers. The panel 7 is kept securely latched in position. The panel 7 is keyed to the top of channel 8.

At each rib R, a strong collapsible tube 32 may be attached to the shell 1. The tubes 32 may be attached to shell 1 with bolts or other suitable fastening means. Each tube 32 has transverse holes 32a through it and it has slots 32b from the transverse holes 32a outwardly. The tube 32 has a crimp 32c at each hole 32a, so it can shorten when the shell 1 flattens, as shown in FIG. 7. A plurality of tube portions 32d are formed by the slotting. When an opposing front bumper 33 or other opposing front member portion 34 of a heavier vehicle, collides with some of the tube portions 32d, the impacted portions 32d are collapsed. The tube portions 32d, that are adjacent to the impacted portions have ends exposed. The exposed ends are hook shaped, thus they form a grappling hook which restrains a bumper 33 or a front portion 34 from disengaging from the safe body. Some impact force is absorbed in crushing the tube portions 32d into a collapsed state.

The safe body has one or more stop or stop brace units D. A stop brace unit D has means to diagonally divert impact force from an opposing heavier vehicle into the roadway and to raise the impacted portion of the safe vehicle body. A stop brace unit D would be most effective when it is positioned adjacent to a rib R, as shown in FIGS. 2 and 7, so that it coacts with the rib R and the shell 1. A support and bumper plate 35 is mounted on the channel 9 with rivets 39 or the like. A plate 35 is a bumper member that supports a unit D. The plate 35 is bent so it has arms 35a and 35b that form an inverted V-shape.

The plate arm 35a has a hooklike lower portion 35c that bears against the bottom of the channel 9. The support plate 35 bends at its peak with hinging action in response to a collision impact on the tube 32 or the shell 1. The plate 35 absorbs some force in bending. The plate 35 may be resilient.

A modification of the support plate 35 may be made by having two plates (not shown) hinged together. Such a combination does not absorb force in hinging, unless spring means or the like is also used with it.

Other members of a stop brace D will be described further on.

The plate 35 has a rectangular tube 40 welded to it. A sliding retainer 41 slidably engages the tube 40. The retainer 41 takes the thrust from the lower edge of the shell 1 and slides down the tube 40 as the shell 1 is spread in flattening under an impact. Retainer bars 42 are fastened to the retainers 41 with machine screws. A bar 42 bears against the lower bulblike edging of the shell 1. Retainer shoes 41b may be fastened to the retainers 41 to provide a slightly yieldable surface which can evenly bear against the roadway 3.

Rib portions 45, 46, 47 and 48 form a typical yieldable rib R. Each rib portion may be slightly resilient and have a transverse hole through its center to allow a rib R to vary in length as it flattens due to an impact. Ribs R help to maintain an arched shape to the shell 1 during a collision until the arched bowed shape is flattened just short of the state of collapsing. There is a wire grid system 49 that links the rib portions together. The wires of the grid 49 act as hinges when the shell area bearing against them flattens during a collision. A rib 45 pivotally engages the pin 53 on the bar 42 to provide a yieldable bearing means. The rib 46 pivotally engages the pin 54 on the bar 17 to provide a fixed pivotal bearing means. Short wires 55 connect the grid 19 to the grid 49 to hold a rib R close to the shell 1.

Horizontal ribs 56 that are similar to ribs 47 and 48, may be used effectively to distribute the impact. The ribs 56 would yield with the shell 1 and restrain the shell from buckling. A rib 56 would spread impact force against it into the adjacent ribs R. The ribs 56 may be omitted in a safe body of limited strength. The shell 1 may have riblike portions 1a and 1b to stiffen it and to provide additional thickness around the wire 19. A sheet 57 is fastened to the channels 8 and 9 and to the tie posts 26. The upper portion of sheet 57 has a corrugation that yields downwardly during a rollover. Sheet 57 may be highly resilient. Sheet 57 has two intermediate corrugations to stiffen it. The sheet 57 seals or encloses the safe body. An elastic seal 60 is attached to the shell 7.

A corrugated tie sheet 61 is fastened to the tie post 26 with bolts 62. The sheet 61 is wrapped around a bar 63 so it is restrained from tearing loose from the bolts 62. The bottom of the sheet 61 engages the shell 1 and it is held by the retainers 41 and 42. The sheet 61 may be made of high carbon steel to allow it to act as a spring.

Each stop brace unit D includes a flanged stiffener plate 64 that is welded to the arm 35a; a flanged stiffener plate 65 that is welded to the arm 35b; a socket plate 69 that is welded to plates 35 and 65, and a pivotal stop brace 70 that is pivotally and slidably mounted on the plate 65 with a pin 71. The stop brace 70 is held in a retracted position as shown in FIG. 2, with a resilient J-shaped strap 72 that is corrugated. The strap 72 yields but does not release the stop brace 70 to allow it to pivot down to a small degree in response to a slight impact on the tube 32. The strap 72 bends aside in response to a great collision impact to allow the stop brace 70 to pivot down to the roadway 3.

A thick stiffener plate 73 is welded to the inside of the channel 9 at each plate 35 to prevent the channel from crushing. At each unit D, a flanged stiffener plate 74 is welded to the floor 15 and to the plate 73 to restrain the channel 9 from pivoting. The strap 72 is fastened to the plate 74, with rivets. The plate 65 has a slotted countersunk hole to allow the pin 71 to slide when the stop brace 70 pivots into positions where it can effectively transmit collision impact force. The pin 71 has a countersunk head that engages the slotted hole in the plate 65. The pin 71 may be press fitted or be welded to the stop brace 70 to prevent the pin from tilting.

As shown in FIGS. 2, 7, 13 and 14, the stop brace 70 has an intermediate cam portion 70a on its upper edge. A bowed spring 76 is positioned above the long sloping portion of the cam 70a and it is fastened to the brace 70 with a machine screw 77. When the bumper 33 and or the front member 34 strikes the tube 32, as shown in FIG. 2, the impact force causes the shell 1 and rib means R to flatten to an extent and push back the lower portion of the shell 1, causing the lower end of the arm 35b to move closer to the arm 35a until the plates 65 and 69 strike the sheeting 57, as shown in FIG. 7. This action causes a portion of the spring 76 to bear against the channel 9 and to be forced downwardly with stop brace 70 by the long sloping surface bearing against the spring 76, thus pushing the spring against the channel 9.

Such cam action is shown in FIG. 16. When the plates 65 and 69 reach their limit or bearing position, the stop brace 70 has been initially pivoted downwardly to the position shown in FIG. 7. The spring 76 bears against the bottom of the channel 9 to restrain the stop brace 70 from bouncing. Impact force from the bumper 33 or the like, is directly transmitted through the tube 32, shell 1, rib 45, sheet 61, retainer 41, tube 40, arm 35b, then through the stop brace 70 into the roadway 3. The cam portion 70a is shaped to cause the stop brace 70 to pivot to a diagonal position where its chisel-shaped tip 70e is substantially at the surface of the roadway 3.

FIG. 13 clearly shows such positioning of the upper portion of the stop brace 70. After some impact force has been transmitted into the roadway 3, the force of the heavier vehicle against its bumper 33, will cause the stop brace 70 to pivot about its point of contact 70c with the roadway 3, tending to cause the impacted end of the safe vehicle to rise. The safe body is restrained from rising to an extent by the weight of its impacted end portion. The force of the heavier vehicle would prevail and cause slight pivoting of the stop brace 70 to the position shown in FIGS. 8 and 14 where a shear key 70d on the stop brace 70 engages a notch 69a in the socket plate 69 and the spring 76 bears firmly against the channel 9 and the shelflike short sloping portion of the cam 70a, as shown clearly in FIGS. 13 and 14. When the stop brace 70 pivots to the position shown in FIGS. 8 and 14, the weight of the impacted end of the safe body is transmitted through the channel 9 onto the spring 76 above the short sloping shelflike portion of the cam 70a, causing the rivets 39 to be sheared, because of being overstressed. The sheet 57 is welded to the channel 9, therefore the rivets 39 are sheared between the sheet 57 and the plate 35. The shear key 70d momentarily restrains the impact force from causing the stop brace 70 to pivot, allowing more impact force to be diverted through the stop brace 70. Then collision force continues to cause the stop brace 70 to pivot, causing the shear key 70d to shear, thus absorbing some force in the shearing action. Further force of the heavier vehicle against the tube 32 causes the stop brace 70 to pivot to the position shown in FIG. 9, thereby causing the hook portion 35c to be pressured upwardly to engage and raise the channel 9, thus causing the impacted end of the safe body to rise and flip upwardly. The bumper 33 and member 34 are clutched by the noncollapsed ends of the tube portions 32d that are adjacent to them, which tends to restrain the stop brace 70 from pivoting and raising the safe body to the position shown in FIG. 9. Tube portions 32d would bear upwardly against the bumper 33 and the like, causing the impacted end of the heavier vehicle to tend to rise. A conventional type of bumper 33 would likely deform and tear or shear loose from the heavier vehicle. A strongly mounted bumper 33 would cause the heavier vehicle to rise unless the weight of the heavier vehicle is so great that tube portions 32d that are pressured against it, deform and allow the safe vehicle to rise. The great forward force of the heavier vehicle would overcome all of the restraining means and cause the heavier vehicle to move forwardly and cause the impacted end of the safe body to rise.

The deformation of the bumper 33 and the tube portions 32d would absorb force in the deformation action. Force would be absorbed in the lifting of the safe body and in any lifting of the heavier vehicle.

There is play between the stop brace 70 and the sheet 57 when the stop brace 70 is in the positions shown in FIGS. 7-9, 13 and 14, thus the stop brace 70 can pivot and slide without binding.

The bowed shell 1 is forced to rise after the sheet 61 stretches to its limit, when the stop brace 70 propels the impacted end of the safe body upwardly, thus the sheet 61 tends to force a tube 32 upwardly.

The duration of collision forces and their actions, that is caused by a violent collision between the light vehicle and a heavier vehicle, is only a small fraction of a second. The stop brace 70 pivots so rapidly to raise the light vehicle that the force tends to propel the light vehicle further than the position shown in FIG. 9. A violent collision would cause the shell 1 and the ribs R to shatter and disintegrate after they have momentarily acted to absorb and divert force. The impacted end of the safe body would have a tendency to rise without being restrained by the lower portion of the shattered bowed shell 1 and its supplementary parts.

When the impacted end of the safe body is propelled upwardly by the pivoting action of the brace 70, the sheet 57, and thus the channel 9, bear against the arm 35a while the light body is rising, thereby restraining the upper portion of the plate 35 from pivoting forwardly.

When the impacted end of the safe body is raised to the position shown in FIG. 9, or when it is flipped higher, high contacting portions of the heavier vehicle are restrained from depressing the impacted end downwardly, because of the upward pressure of the stop brace 70, thereby causing the force from the heavier vehicle to push the impacted end of the safe body forwardly and upwardly, allowing the heavier vehicle to wedge under the impacted end of the safe body, or to push the safe vehicle so the impacted end continues to rise as it is pushed.

There is a grappling hooklike projection 41c on each retainer 41. When the shell 1 and the tube 32 collide against a wall and flatten, the grappling hook 41c tends to hold to the wall and prevent the vehicle from leaping over the wall. The hook 41c is shielded by the lower portion of the tube 32 until the shell 1 and the tube 32 is flattened.

Each retainer 41 may have a spike or offset 41d. A spike 41d would tend to be driven into the roadway 3 when the adjacent portion of the shell 1 is flattened. The spike 41d momentarily gouges the roadway 3, as shown in FIG. 7, and restrains the retainer 41 from being pushed forwardly to an extent. When the grappling hook action of the tube 32 causes the two vehicles to lock together and the impacted end of each vehicle is hurled upwardly, the rising action of the heavier vehicle tends to jolt occupants of the heavier vehicle and to materially deform the heavier vehicle. The rising action would also tend to bend up the impacted end portions of both vehicles. The weight and the strength of the heavier vehicle would tend to resist the upward force, therefore, the light safe vehicle will tend to tear loose by tearing off portions of the impacted end of the opposing vehicle. When the safe vehicle rises further, the opposing heavier vehicle would tend to wedge or nose under it, causing the impacted end of the safe vehicle to be pushed upwardly so that it attains a position on an upper portion of the opposing vehicle.

When the impacted portion of a safe lightweight automobile body is raised by the shell 1 flattening under a collision impact against a heavy truck, bus, locomotive or the like, the safe vehicle is pushed backwardly or aside by the heavy vehicle, thus tending to prevent the heavier vehicle from riding over top of it and crushing it.

Lightweight and highly compressible foam plastic 78 or the like may be placed in the space between the shell 1 and the sheets 61 to act as a cushioning means.

The shell and ribs of a door 5 can flatten under a collision impact and divert force into the roadway 3 and into lifting action. As described fully in my U.S. Pat. No. 3,056,627, at each door post 11, a stop brace unit D and a rib R may be incorporated into the safe body, so as to provide protection when a vehicle with a safe body is struck in a side by a heavier vehicle. The door post 11 coacts with a unit D, like the tie post 26 acts. The tubes 32 may be omitted from the sides of the vehicle, since they would retard airflow. Sharp front bumper and grill portions of an opposing automobile would puncture a shell 1 and act to a degree like the tubes 32, to restrain the safe body from rising too readily, thus allowing impact force to be diverted diagonally into the roadway 3, before the brace 70 causes the impacted side of the safe body to be propelled upwardly.

The door 5 can engage and interlock with the portions of the shell 1 that are adjacent to it, so a collision impact on a door 5 can be transmitted to the adjacent shell portions 1 and thus into the stop brace units D. My U.S. Pat. No. 2,916,324 shows means to interlock a bowed door with the adjacent shell portions so they coact.

The stop brace 70 may be made of strong steel. The free end 70e of the stop brace 70 has a chisellike point, so that it can penetrate the roadway 3. When the vehicle is to be used primarily on soft-surfaced roads or the like, a stop brace 79, with a pivotally mounted friction shoe 80, shown in FIG. 10, would be used instead of the chisel pointed brace 70. The chisel point would penetrate a soft-surfaced roadway too readily, thus it could not transmit a great momentum force into the roadway. The broad bearing surface of the shoe 80 would allow a considerable momentum force to be diverted into the roadway 3, although a much heavier opposing vehicle would tend to cause the shoe 80 to slide to an extent. The stop brace 79 would be used against hard-surfaced roads where governing bodies would not allow the use of the chisel pointed brace 70 because the chisel point would gouge a roadway.

A modification of the arrangement shown in FIG. 2 may be made by omitting the bowed bumper portion formed by the shell 1 and its supplementary parts, the tube 40 being a bumper that is impacted and crushed by the heavier vehicle's bumper 33.

A still further modification may be made by omitting the tube 40, the plate arm 35b being a bumper that is impacted by the heavier vehicle's bumper 33. The post 26 restrains the top of the plate 35 from being forced to deform forwardly when a high opposing member 34 of the like, strikes high up on the plate 35.

Other types of positive force means, such as hydraulic and pneumatic cylinders (not shown), may be used in place of the cam 70a.

Although the safe body having bowed shell portions and units D, would be most effective in diverting and cushioning collision forces, conventional lightweight automobile bodies may have pivotal stop brace units D incorporated in their structure, to provide a high degree of protection. A modification shown in FIG. 16, shows a stop brace 70 mounted on a conventional lightweight vehicle. A conventional bowed in length and width type of bumper 81 that is used on many small automobiles, engages the arm 35b. A collapsible tube 82 is fastened to the plate 35. The tube 82 is like the tube 32, except that it is not crimped. The tube 82 is shaped to fit the outside of the bumper 81.

Conventional sheeting 83 is fastened to a chassis channel 9a. A tubular strut 84 may be used to restrain the plate 35 from deforming and tilting towards the sheeting 83. The strut 84 is fastened to a strong portion of the interior of the vehicle. The strut 84 is lightly welded to the plate 35, so the tube 82 can break away from the plate 35 when most of the safe body is propelled upwardly by the pivoting of the stop brace 70. An opposing bumper 85 on a heavier vehicle, is shown collapsing the tube portions 82d, and causing the arm 35b to pivot forwardly and force the stop brace 70 to pivot downwardly. FIG. 16 shows the stop brace 70 being forced downwardly by the engagement of the spring 76 and the cam portion 70a against the channel 9a.

There are obviously many possible modifications of the safe vehicle body that would provide limited protection. A modification may have an end portion without a shell 1. The sheets 57 and 61 act as the shell portions of the ends of the vehicle body. Tubes 32 are attached to the ribs R.

Other modifications may omit all or some of the yieldable ties.

Thus I have described a safe vehicle body that can progressively cushion and divert collision impact force from a heavier vehicle that collides with it, so as to prevent severe deformation of the occupant's compartment of the safe body.

While I have illustrated and described certain specific embodiments of my invention, it will be understood that these are by way of illustration only, and that various changes and modifications may be made within the scope of the following claims.

I claim:

1. In a vehicle, an outer body portion means including a stop means, said stop means including a yieldable bumper portion means and a stiff stop brace means, said stop brace means having an end portion means, said end portion means including pivotal mounting means in close proximity to said bumper portion means, said stop brace means extending inwardly from said pivotal mounting means in a direction towards the central portion of said vehicle, said stop brace means being in a retracted position normally, said stop means including positioning means responsive to a collision force against said bumper portion means by a heavy vehicle, said positioning means causing said stop brace means to pivot downwardly from said retracted position to a diagonal position that slopes downwardly and inwardly from said pivotal mounting means so that the other end of said stop brace means engages a roadway, said pivotal mounting means being movable about a sufficient arcuate range to allow said stop brace means to pivot away from the initial collision place about the point of engagement of said stop brace means with said roadway in response to said collision force pushing and moving said vehicle, said stop means including shear key restraining means that acts to momentarily restrain said stop brace means from pivoting far from said collision place, said shear key restraining means shearing in response to said collision force, thereby allowing said stop brace means to pivot farther away from said collision place and causing said outer body portion means to rise, whereby much of said collision force is diverted diagonally through said stop brace means into said roadway, and whereby said shear key restraining means lengthens the period in which said collision force is diverted diagonally and whereby some of said collision force is expended in shearing said shear key restraining means and whereby some of the remainder of said collision force is expended in forcing the impacted end of said vehicle to pivot upwardly.

2. A combination as recited in claim 1, wherein said positioning means includes cam means, whereby said stop brace means is forced to pivot downwardly with positive nonlagging action.

3. A combination as recited in claim 1, together with spring means that pressures downwardly against said stop brace means after the impact of said collision force, whereby said stop brace means is forced to maintain contact with said roadway.

4. A combination as recited in claim 1, wherein said stop means includes shear means to jettison at least said stop brace means after said outer body portion means is raised, whereby said outer body portion means is flipped higher.

5. A combination as recited in claim 1, wherein said bumper portion means includes transverse slits that terminate outwardly, thereby forming a plurality of yieldable portions defined by said slits, at least one of said yieldable portions crushing in response to said collision force, thereby causing said yieldable portions that are adjacent to said crushed yieldable portion to grapple said heavy vehicle and restrain said stop brace means from pivoting and raising said outer body portion means, whereby said collision force is diverted diagonally during a longer period.

6. A combination as recited in claim 1, wherein said other end includes a sharp extremity, whereby said sharp extremity can penetrate the surface of said roadway.

7. A combination as recited in claim 1, wherein said other end includes a pivotally mounted friction shoe, whereby said stop brace means can transmit much of said collision force into a soft surfaced roadway.

8. A combination as recited in claim 1, wherein said outer body portion means includes a rigid frame and wherein said bumper portion means includes a stiff yieldable bumper shaft means outwardly arched throughout in a vertical plane, fixed pivotal bearing means attached to said frame, said fixed pivotal bearing means pivotally engaging the upper portion of said bumper shaft means, a yieldable bearing means mounted on said outer body portion means, said yieldable bearing means engaging the lower portion of said bumper shaft means so as to permit the lower portion of said bumper shaft means to move downwardly away from said upper portion and strike against said roadway as the result of said collision force against the outer surface of said bumper shaft means which results in partial flattening of said bumper shaft means, causing said upper portion to rise and tend to raise the adjacent portion of said vehicle away from said roadway, causing lifting action which absorbs much of said collision force, thereby cushioning said collision force, whereby said collision force is progressively absorbed to prevent critical deformation of occupant's compartment.

9. A combination as recited in claim 1, wherein said yieldable bumper portion means includes resilient means for absorbing some of said collision force.

10. A combination as recited in claim 1, wherein said bumper portion means includes substantially vertical arm portion means whose upper extremity is yieldable to allow movement of the lower extremity of said vertical arm portion means in a direction away from said heavy vehicle to force said stop brace means to pivot downwardly to said roadway.

11. A combination as recited in claim 1, wherein said outer body portion means includes a rigid frame and wherein said bumper portion means includes a slightly flexible panel outwardly bowed in a vertical direction, said bumper portion means includes means to stiffen said panel to prevent said panel from buckling, fixed pivotal bearing means interconnected to said frame, said fixed pivotal bearing means pivotally engaging the upper portion of said panel, a yieldable bearing means mounted on said outer body portion means, said yieldable bearing means engaging the lower portion of said panel so as to permit said lower portion to move downwardly away from said upper portion and strike against said roadway as the result of said collision force against the outer surface of said panel which results in partial flattening of said panel, causing said upper portion to rise and tend to raise the adjacent portion of said vehicle away from said roadway, causing lifting action which absorbs much of said collision force, thereby cushioning said collision force, whereby said collision force is progressively absorbed to prevent critical deformation of occupant's compartment.

12. A combination as recited in claim 2, together with spring means that pressures downwardly against said stop brace means after the impact of said collision force, whereby said stop brace means is forced to maintain contact with said roadway.

13. A combination as recited in claim 2, wherein said stop means includes shear means to jettison at least said stop brace means after said outer body portion means is raised upwardly, whereby said outer body portion means is flipped higher.

14. A combination as recited in claim 2, wherein said bumper portion means includes substantially tubular portion means having transverse slits that terminate outwardly, thereby forming a plurality of yieldable portions defined by said slits, at least one of said yieldable portions crushing in response to said collision force, thereby causing said yieldable portions that are uncrushed and adjacent to said crushed yieldable portion to grapple said heavy vehicle and restrain said stop brace means from pivoting and raising said outer body portion means, whereby said collision force is diverted diagonally during a longer period.

15. A combination as recited in claim 5, wherein said bumper portion means includes tubular portion means, and wherein said slits are in said tubular portion means, said tubular portion means including a plurality of transverse holes, each of said holes being engaged with one of said slits, whereby crushing of one of said yieldable portions causes said yieldable portions that are adjacent and uncrushed to form grappling hook means to securely grapple said heavy vehicle.

16. A combination as recited in claim 8, together with a yieldable tie means having a lower tie portion engaging said lower portion of said shaft means and an upper tie portion interconnected with said rigid frame so that said upper tie portion cannot yield with respect to said vehicle, whereby when said shaft means is flattened by said collision force, some of said collision force is expended in causing said yieldable tie means to yield.

17. A combination as recited in claim 8, wherein said shaft means are two shafts in spaced relationship, together with a slightly flexible panel outwardly arched in a vertical plane extended horizontally, said panel fastened to said outer surface of said shaft means, whereby said collision force against said panel causes said panel to flatten to an extent as it spreads said collision force into said two shafts.

18. A combination as recited in claim 8, wherein said bumper portion means includes spike means projecting downwardly from its lower extremity, whereby said spike means penetrates said roadway and restrains said vehicle from moving laterally.

19. A combination as recited in claim 10, wherein said vertical arm portion means consists of at least two arms in spaced relationship, together with a tie beam interconnected to said two arms, whereby said collision force against said tie beam causes much of said collision force to be safely absorbed and be diverted.

20. A combination as recited in claim 10, together with bracing strut means to restrain said upper extremity from moving towards said central portion when said collision force is made against said bumper portion means.

21. A combination as recited in claim 11, together with yieldable tie means having a lower tie portion engaging said lower portion of said panel and an upper tie portion interconnected with said rigid frame, so that said upper tie portion cannot yield with respect to said vehicle, whereby when said panel is flattened by said collision force, some of said collision force is expended in causing said yieldable tie means to yield.

22. A combination as recited in claim 12, wherein said stop means includes shear means to jettison at least said stop brace means after said outer body portion means is raised upwardly, whereby said outer body portion means is flipped higher.

* * * * *